United States Patent [19]

Salvaudon et al.

[11] 4,143,371
[45] Mar. 6, 1979

[54] ARRANGEMENT FOR DISCRIMINATING CLUTTER SIGNALS FROM TARGET SIGNALS IN A RADAR SYSTEM

[75] Inventors: Laurence Salvaudon; Jean-Claude Charlot, both of Paris, France

[73] Assignee: Thomson-CSF, Paris, France

[21] Appl. No.: 840,712

[22] Filed: Oct. 11, 1977

[30] Foreign Application Priority Data

Oct. 15, 1976 [FR] France ................................ 76 31070

[51] Int. Cl.² .............................................. G01S 9/22
[52] U.S. Cl. ................................ 343/16 R; 343/16 M; 343/7 A
[58] Field of Search .................... 343/16 M, 16 R, 7 A

[56] References Cited

U.S. PATENT DOCUMENTS

| 3,353,180 | 11/1967 | Anderson | 343/16 M |
| 3,795,909 | 3/1974 | Vehrs, Jr. | 343/16 M |
| 3,992,710 | 11/1976 | Gabriele et al. | 343/16 M |

Primary Examiner—Maynard R. Wilbur
Assistant Examiner—Lawrence Goodwin
Attorney, Agent, or Firm—Cushman, Darby & Cushman

[57] ABSTRACT

An arrangement for protecting radars against unwanted echos such as "clutter" using an angular divergence measuring signal. This signal is compared with two predetermined thresholds + xo and − xo. When the probability of the two thresholds being exceeded by the divergence signal is greater than a predetermined value Po, the arrangement generates a logic signal which is used to prevent the tracking circuits of the radar from locking on to the received echo.

6 Claims, 4 Drawing Figures

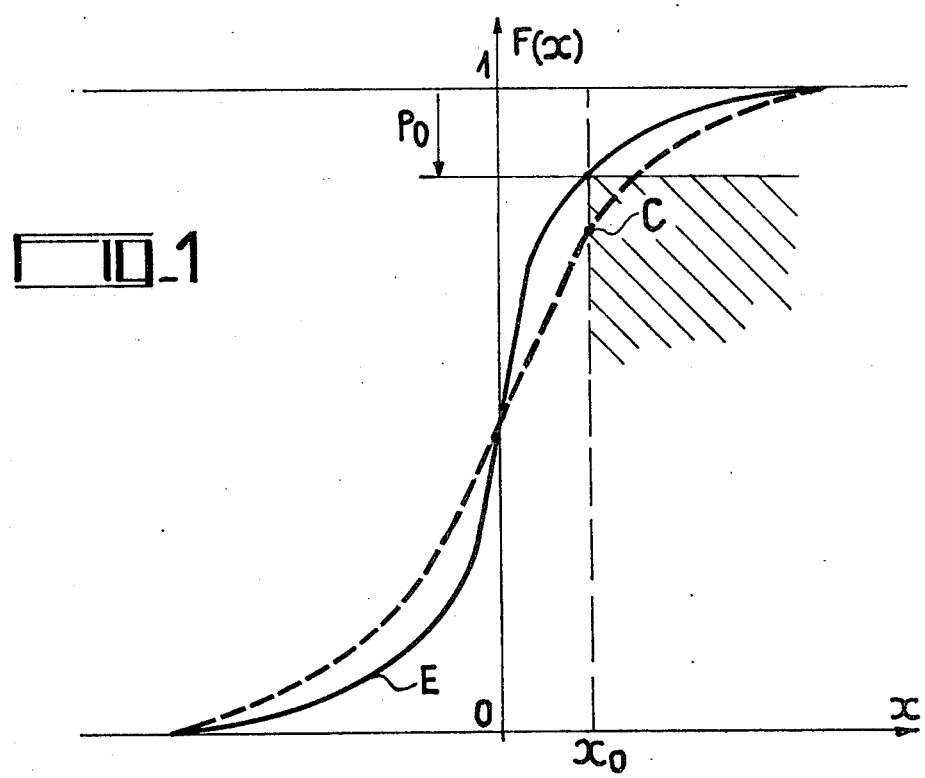
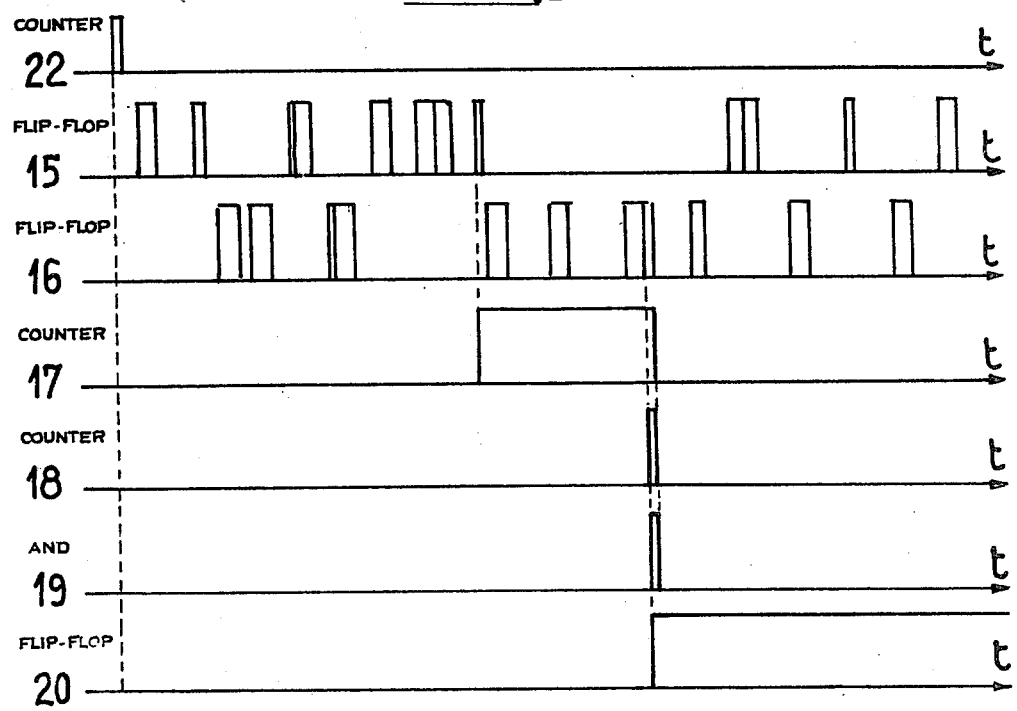

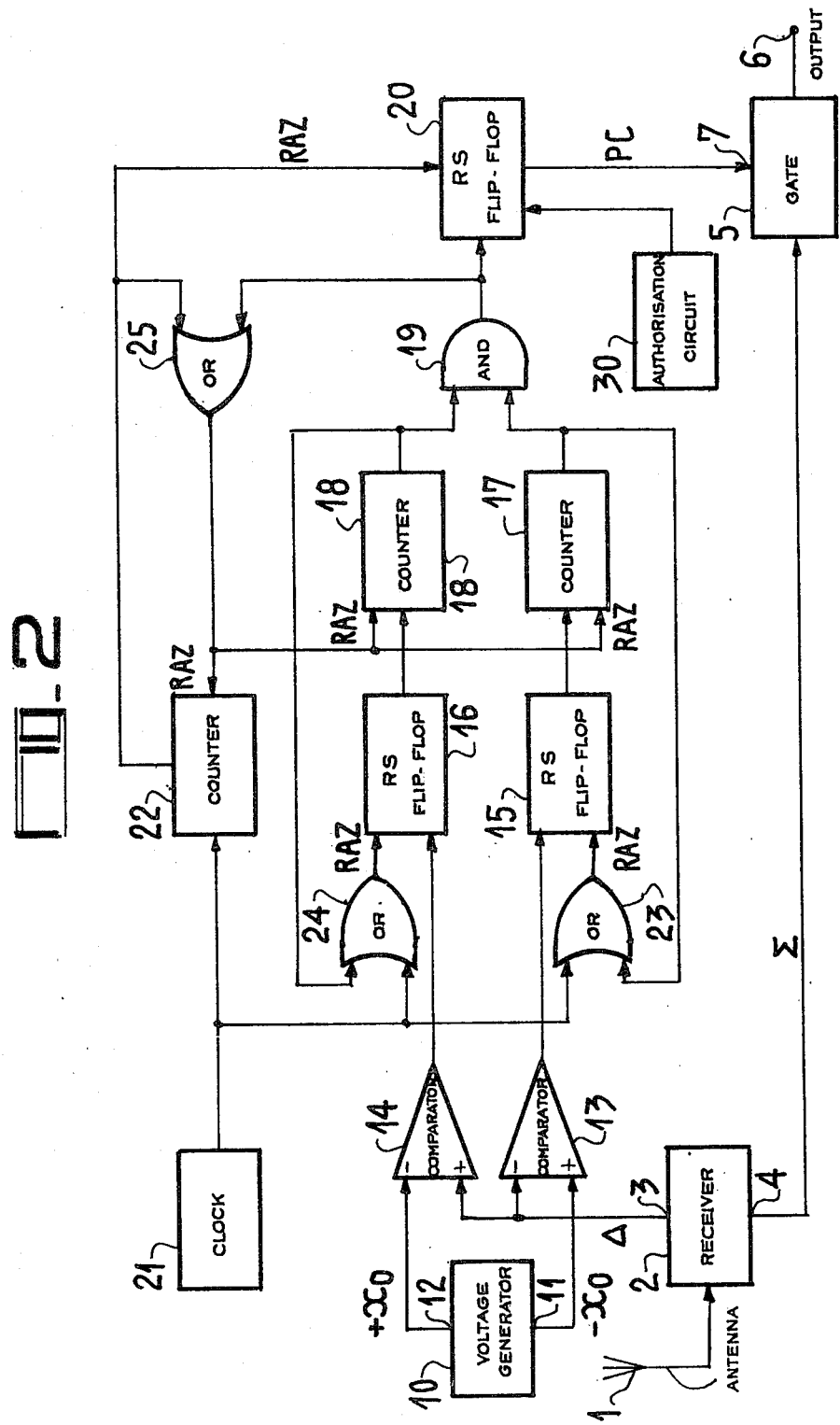

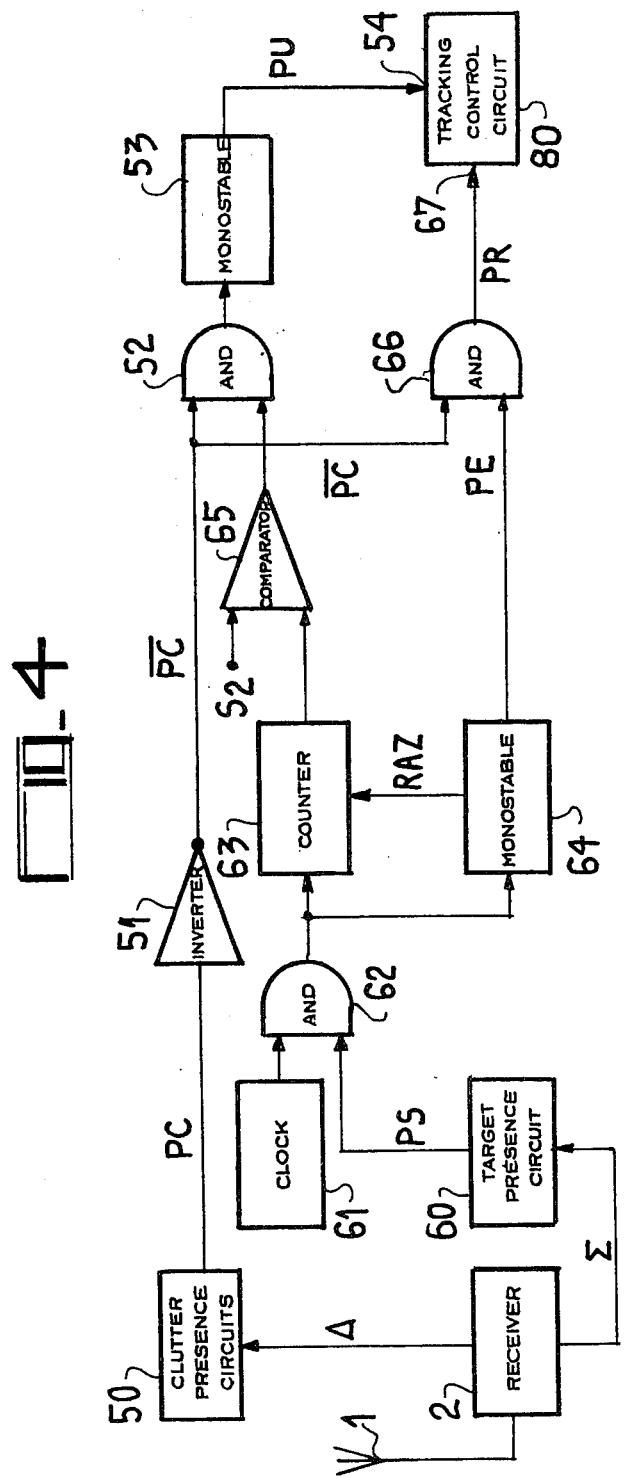

ARRANGEMENT FOR DISCRIMINATING CLUTTER SIGNALS FROM TARGET SIGNALS IN A RADAR SYSTEM

The invention relates to an arrangement for discriminating unwanted echos detected by radars, from wanted echos such as target echos. It also relates to radar systems incorporating such an arrangement and in particular to target-tracking radars and the missile radars known as homing radars.

By way of example, echos which are not wanted by a pulsed radar intended to acquire and track (or guide a missile to) a target on the sea or close to the sea, are those due to radiations reflected by the coast (cliffs, beaches, large buildings, obstacles on the ground), by clouds, hail, or rain, by decoys and by the sea (the sea echos being commonly termed "sea clutter"). These unwanted echos are designated generally by the term "clutter". The word "target" is used for designating wanted echos which may be echos from a surface vessel or from an aircraft flying at low altitude. The tracking radar is generally assisted by a surveillance radar which reports a possible target or targets to it. As a result of interference or disturbances of any kind, the report given by the surveillance radar may be erroneous, which causes the tracking radar or the missile to carry out a search for its target or targets both in range, and in bearing, and possibly in elevation, doing so within limits of uncertainty which are wider the less definite is the report.

The problem consists in being able to differentiate a wanted echo from the unwanted echos during the search phase anywhere within the limits of uncertainty and if possible in the minimum time, to enable the echo from the target to be acquired and to enable the missile to accomplish its mission successfully. This amounts to performing a test on each detected echo to determine whether it is wanted. If this is the case, tracking is resumed until a fresh echo is detected.

A known solution which enables the presence of an unwanted echo to be detected consists in performing a spectral analysis of the received signals. For example, one of the chief characteristics of a decoy formed by a cloud of small, light conductive elements is the width of its frequency spectrum. Unfortunately, when they are manoeuvring rapidly, small marine targets have the same spectral characteristic and may be confused with a decoy. In the case of sea echos, one way round the problem is to take advantage of the fact that when vertically polarised these echos have a much greater spectral width than do echos from marine targets. However, circuits for analysing the spectrum of received signals are not able to distinguish the target from sea echos and small ground echos with sufficient reliability.

For the sake of convenience, the term "clutter" will be used in the remainder of the description to refer to the majority of unwanted echos. It is these echos which are the most difficult to discriminate from useful echos.

One object of the present invention is to eliminate unwanted echos of this kind with a high degree of reliability, on the basis of the information provided by the signal in a divergence measuring channel, that is to say a reception channel which senses angular displacement between the direction in which the echo lies and the axis of the antenna.

If the radar receives a clutter echo the above signal exhibits wide fluctuations corresponding to the surface of the sea illuminated by the beam from the antenna. It is then possible, in accordance with the invention, to make use of the difference in fluctuation between the useful signal and the clutter signal. In addition, fluctuations due to clutter are symmetrical about the plane of symmetry of the antenna and give positive and negative signals in the divergence measuring channel with equal probabilities, whereas a useful target, if it does not lie in the plane of symmetry of the antenna, produces positive and negative signals with different probabilities while if it does lie in this plane of symmetry it produces no signal.

The selection criterion applied in accordance with the present invention provides a high degree of reliability in detecting unwanted echos. One of the chief advantages of the invention lies in the fact that the detection threshold of the receiver may be lowered without an increase in false alarms, since such false alarms are eliminated by the arrangement according to the invention. In this way the detection rate of the radar is increased.

In accordance with a feature of the invention, there is provided, in a radar system having an antenna, an arrangement for discriminating clutter reception signals from target reception signals, said arrangement comprising:

means for supplying signals indicating the angular divergence between the direction from which are received said reception signals and at least one plane of symmetry of the antenna;

first comparing means connected to said receiving means for comparing the said angular divergence signals with a first positive threshold + xo;

first measuring means for measuring the probability P1 with which the threshold + xo is exceeded by said divergence signals;

second comparing means connected to said receiving means, for comparing the said angular divergence signals with a second negative threshold − xo;

second measuring means for measuring the probability P2 with which the threshold − xo is exceeded by said divergence signal, and third comparing means for comparing said probabilities P1 and P2 with a predetermined value Po and producing a clutter presence signal when said probabilities P1 and P2 are simultaneously greater than Po.

There are many methods of measuring the probabilities of exceeding a threshold. The following description describes one way of performing such a measurement. The means for receiving the divergence measuring signals are conventional. For this purpose the antenna array of the radar system includes an antenna which has an odd radiation diagram in bearing. The difference channel of monopulse antenna for example gives a diagram of this kind.

The signal indicating the presence of an unwanted echo is then used in the radar to prevent the radar from locking-on to this echo and to cause the search, for useful echos to be continued within the limits of uncertainty.

Other features and advantages of the invention will become apparent from the following description, which is illustrated by the Figures, which show:

FIG. 1, a distribution function for a signal representing angular divergence in bearing, FIG. 2, a diagram of the arrangement according to the invention.

FIG. 3, a sequence of the signals in the main circuits of the arrangement according to the invention, FIG. 4, a specific application of the clutter present signal.

The reception signal in a tracking radar, for example, which is locked-on to a target is generally disturbed by thermal noise, the noise due to angular fluctuations of the target and the noise due to interference echos surrounding the target which are generally referred to as "clutter". The signal-to-clutter ratio is low in the case of targets on the sea since the sea reflects energy in the whole diagram of the antenna of the radar and the clutter echos exhibit wide angular fluctuations. To determine whether a detected echo derives from clutter ("clutter present") or from a target, attempts have to be made to exploit the difference in signal fluctuation in the two cases.

In accordance with the invention, at the beginning it is the signals supplied by an angular measurement channel or divergence measurement channel which are analysed. These signals may simply come from the bearing difference channel of a monopulse radar which is equalised by the sum channel. Such a radar needs to incorporate a special antenna having an even, directional radiation diagram in the case of the sum channel and an odd radiation diagram which has a gap on the axis of the antenna in the case of the difference channel. It is also possible to extract divergence measuring signals from a scanning radar. The invention is not limited to one particular type of radar provided a signal for measuring angular divergence is able to provide the information referred to below. For the sake of simplicity and by way of example, it will be assumed in the remainder of the description that the divergence measuring signals which are analysed come from the bearing difference channel of a monopulse antenna and that these signals are applied to the arrangement according to the invention at low frequency. The signals in question are standardised by those of the sum channel of the antenna so that their amplitude corresponds for example to a gradient of 1 volt per degree of divergence from the axis of the antenna. They are also analysed after 100 Hz low-pass filtering with a high cut off frequency.

Statistical analysis of the signal shows that its distribution function follows an approximately gaussian law whether it derives from a target or from clutter.

FIG. 1 shows the distribution function $F(x)$ as a function of the amplitude x of the filtered divergence measuring signals, in the case of clutter signals (curve C) and in the case of target signals (curve E). In the case of the clutter this function is approximately gaussian because of the symmetry of the surface of the sea on either side of the axis of the antenna. In the case of the target it is generally agreed that the signal follows a gaussian law with a standard deviation $\delta$ max. equal to K times the apparent length of the target, K times the apparent length of the target, K being between approximately 0.18 and 0.25.

It is found that on average the standard deviation which characterises distribution in the case of the clutter is considerably greater than the standard deviation in the case of a target.

Also, in the case of clutter, the standard deviation decreases when range increases. The radar discerns less difference between fluctuations of the surface of the sea at long range than at short range.

Finally, the state of the sea also has an effect on the value of the standard deviation, it being greater when the sea is high than when it is calm. From a group of measurements, a minimum value of standard deviation has been determined for clutter. If a signal has a distribution whose standard deviation is greater than this minimum $\delta$ min. there is a very good chance that clutter is present.

In other words, the arrangement according to the invention makes use of the fact that for a given value of the signal x, the probability that clutter is present is greater than the probability that a target is present.

It is necessary to select a threshold x which, for a distribution function whose standard divergence is $\delta$ min, gives a probability $Po = 1 - F(x)$ of x being greater than xo.

If, for any signals, the probability P of x exceeding xo is greater than or equal to Po, it may be concluded that clutter is present.

The threshold (Po, xo) needs to be selected in such a way as to enable there to be the maximum difference between two signals even if their distribution is very close. This is the case for example with a target of considerable length or span which gives a standard deviation close to $\delta$ min.

Calculating the extremes of the function $F(x, \delta 1) - F(, \delta 2)$ suggests the adoption of a value of 16% for the probability Po. To allow for the symmetry of the clutter, it must therefore be concluded that clutter is present if over a given period the probability Po of x being greater than xo and the probability PO of x being less than $-$ xo are both met. If these conditions are not satisfied, the divergence measuring signal probably derives from a target.

FIG. 2, is a diagram of the arrangement according to the invention. This arrangement has the following characteristics. The frequency spectrum of clutter is limited to 100 Hz. The samples which enable calculations to be made of the probability of the thresholds $\pm$ xo being exceeded are independent. Their duration is 1.6 milliseconds, which is the auto-correlation period corresponding to the spectrum of the clutter. The selected analysis period is 80 milliseconds, representing 50 samples of 1.6 milliseconds. The optimum threshold, corresponding to a probability of 16%, is 8 samples per analysis period.

FIG. 2 shows, in a very simplified fashion, an antenna 1 coupled to a receiver 2 which supplies a bearing divergence measuring signal $\Delta$ from an output terminal 3 and a sum received signal $\epsilon$ from an output 4. The sum signal is supplied to a gate 5 which is normally in the conductive state, which transmits this sum signal $\epsilon$ to an output terminal 6. An echo signal is thus available at output 6 when gate 5 is in the open state.

The object of the arrangement according to the invention is to detect the nature of the reception signal and to cause the gate 5 to be shut when this signal represents an unwanted echo.

The divergence measuring signals $\Delta$ are applied on the one hand to the non-inverting input (+) of a comparator 14 and on the other hand to the inverting input (−) of a comparator 13. A generator 10 produces two voltages of the same amplitude and opposite sign, namely a voltage + xo which is applied to the (−) input of comparator 14 and a voltage − xo which is applied to the (+) input of comparator 13. The comparator 13 and 14 are high gain differential amplifiers, for example, which emit binary signals under the following conditions:

|  | Δ < − xo | − xo < Δ < + xo | Δ > + xo |
|---|---|---|---|
| Comparator 13 | 1 | 0 | 0 |
| Comparator 14 | 0 | 0 | 1 |

A clock 21 emits pulses whose period is 1.6 milliseconds. This clock is connected to a counter 22 for counting from 1 to 50 and to two OR circuits 23 and 24 each having two inputs.

The comparators 13 and 14 are connected to respective RS type flip-flops 15 and 16 which are followed by respective counters 17 and 18 for counting from one to eight. The outputs of counters 17 and 18 are connected to an AND circuit 19 which controls a third RS flip-flop 20 which controls the opening or closing of gate 5.

The outputs of counters 17 and 18 are also connected to second inputs of OR circuits 23 and 24 respectively. A third OR circuit 25 has two inputs which are connected to the output of AND circuit 19 and to the output of counter 22, and an output which is connected to the zero-reset inputs (RAZ) of counters 22, 17 and 18. The outputs of OR circuits 23 and 24 are connected to the zero-reset inputs (RAZ) of flip-flops 15 and 16 respectively. The output of counter 22 is connected to the zero-reset input (RAZ) of flip-flop 20. Finally, an authorisation circuit 30 is connected to flip-flop 20 to block or authorise changeovers.

The signals Δ which are emitted ty receiver 2 after 100 Hz band-filtering are first compared with the thresholds + xo and − xo. If one of these two thresholds is exceeded, the RS flip-flop which follows the comparator concerned changes its state and remains in this state until a pulse from the clock 21 resets it to zero. Thus, for a period of 1.6 milliseconds, this flip-flop logs only a single crossing of the threshold.

Each of the periods of 1.6 milliseconds during which Δ is greater than + xo or is less than − xo is counted either by counter 18 or by counter 17. As soon as the over-threshold minimum has been reached (the two counters having reached or passed a quantity of eight), RS flip-flop 20 changes state and generates a "clutter present" signal PC which shuts gate 5. This flip-flop is returned to its initial state at the end of a period of 80 milliseconds by means of counter 22. At the same time the three counters 22, 17 and 18 are reset to zero and a new cycle begins.

When one of the counters 17 or 18 reaches eight, the flip-flop which precedes it is reset to zero. There is no further change in the output signal from the counter until the end of the 80 millisecond cycle, by virtue of the function performed by OR circuits 23 and 24. This provision has the advantage of providing an output signal PC which is easy to use. This logic signal does not change state between two successive analysis periods.

In addition, because of OR circuit 25, if the presence of clutter is detected before the end of an 80 millisecond cycle, a fresh analysis sequence begins at once, which increases the speed with which the arrangement acts.

FIG. 3 shows a sequence of the signals in the main circuits of the arrangement according to the invention, it being assumed that the number of times thresholds are exceeded is sufficient to cause the signal indicating the presence of clutter to appear during this sequence.

The first line represents the pulse which is emitted by the counter 22 at the end of the preceding 80 millisecond sequence, in the course of which there was no clutter present. The counters 17 and 18 are likewise reset to zero.

The following line shows the pulses emitted by flip-flop 15. These pulses have a miximum duration of 1.6 milliseconds since the flip-flop is reset to zero by clock 21 at the end of each of these periods. The eighth pulse is short since it causes a change of state at the output of counter 17, which latter resets flip-flop 15 to zero. Then, as long as counter 17 is in the one state, flip-flop 15 remains blocked.

The next line shows in similar fashion the output pulses from flip-flop 16. These pulses cannot coincide in time with those from flip-flop 15 for the reason that the pass band of the Δ signals is only 100 Hertz and the signals cannot therefore exceed both thresholds in the course of one and the same period of 1.6 milliseconds.

The next line represents the output signal from counter 17; The pulse concerned is one which begins at the beginning of the eighth pulse from flip-flop 15 and which ends at the moment when AND circuit 19 changes state.

The next line represents the output pulse from counter 18, which corresponds to the eighth pulse from flip-flop 16. Since the counters 17 and 18 are then in the 1 state, the AND circuit 19 changes over, which is represented on the next line, and all the circuits 15 to 19 return to the 0 state for a further count.

The next line represents the changeover of flip-flop 20 at the time when AND circuit 19 changes state. The state of this flip-flop is constant until a zero-reset pulse arrives from counter 22. Since this counter was reset to zero at the same time as flip-flop 20 changed state, the latter remains in this state for at least a further 80 milliseconds. The "clutter present" signal is thus a pulse having a duration of at least 80 milliseconds.

For the "clutter present" signal to cease, it is therefore necessary that the two counters 17 and 18 should not count to their maximum within a period of at least 80 milliseconds.

FIG. 4 shows a specific application of the "clutter present" signal which is emitted by the arrangement according to the invention. Instead of operating a simple gate as in the example in FIG. 2 what is involved is controlling the circuits 80 for automatically tracking the target of a radar. Signals of two kinds are required to control these tracking circuits, the structure of which is not pertinent to the present application. A search-activating signal PR which is applied to a terminal 67 causes the uncertainty field of the radar to be scanned or this scanning to stop. When the search has been stopped, a signal PU confirming a useful target causes the target to be tracked automatically.

The arrangement 50 for detecting the presence of clutter, which is connected to the output of a receiver 2 which is in turn connected to an antenna 1, is that shown in FIG. 2. This arrangement emits a signal PC which is on the logic 1 level if the presence of clutter is detected and on the logic 0 level in the opposite case. A logic inverter circuit 51 inverts the signal and emits a signal $\overline{PC}$ which is applied to one input of an AND gate 52.

The sum signal ε emitted by the receiver is used to determine the presence of a useful echo in a circuit 60. The circuit 60 operates by comparing the levels of the signals in two or more consecutive range windows, with the higher or highest level indicating the presence of the useful echo in the window concerned. The circuit 60 emits a signal PS which is applied to an AND gate 62. A clock 61 whose operating frequency is 1600 Hertz also supplies pulses to AND gate 62.

A counter 63 and a monostable circuit 64 are connected to the output of AND gate 62. The counter 63 is reset to zero (RAZ) by the monostable after each period of 70 milliseconds. The output signal PE from the monostable, and the signal $\overline{PC}$, are applied to an AND circuit O6 which transmits to terminal 67 of the tracking circuits the aforementioned search activating signal.

The output signal from counter 63 is compared to a threshold S2 in a comparator 65. The result is applied to an AND circuit 52 at the same time as signal $\overline{PC}$. The output of AND circuit 52 is connected to a monostable circuit 53 whose monostable period is one second, for shaping purpose. The output of monostable 53 supplied the confirmation signal PU to terminal 54 of the tracking circuit 80.

The way in which this group of circuits operates is as follows. Together with an echo present signal PS, the "clutter present" signal PC is used to validate a confirmation signal which terminates the search and locks on the radar tracking.

The clock 61 associated with AND circuit 62 converts the signal PS into a series of pulses. The counter 63 and the monostable 64 associated with threshold comparator 65 measure the number of times threshold 52 is exceeded by PS. The signal obtained is thus a signal for "presence of echo confirmed". This signal is then validated by signal $\overline{PC}$ in AND circuit 52 and is applied to the tracking circuit after being shaped (monostable 53). If clutter is detected, the signal $\overline{PC}$ changes to the 0 level and inhibits the confirmation signal.

In addition, signal PS generates a signal PE for "lock-on not confirmed", which is received at the output of monostable 64. This signal, when it appears brings the search phase to an end. The signal $\overline{PC}$ acts as validation.

To reduce the number of logic components it is possible to use the same reference counter, which is triggered by the appearance of PS, in the "clutter present" and "echo present" circuits.

Similarly, the structure described may easily be modified for negative logic to perform the same functions and to give the same results.

The present invention enables the probability of detecting useful targets to be increased since, the clutter echos having been eliminated, it is possible to lower the detection threshold and thus to increase the probability of detection.

To prevent the tracking circuits from disengaging in cases where the useful target is too close or too wide (the angle over which the target is seen is too great) it is to hold the authorisation signal $\overline{PC}$ on by means of the AGC (the automatic gain control of the receiver) voltage and/or the voltage for controlling the range windows.

The invention is applicable to tracking radars and in particular to the guidance of missiles.

What is claimed is:

1. In a radar system having an antenna, an arrangement for discriminating clutter reception signals from target reception signals, said arrangement comprising:
   means for supplying signals indicating the angular divergence between the direction from which are received said reception signals and at least one plane of symmetry of the antenna;
   means for generating two signals + xo and − xo of opposite sign;
   first comparing means for comparing said angular divergence signals with said signal + xo;
   first sampling and counting means for sampling and counting the output signals of said first comparing means;
   second comparing means for comparing said angular divergence signals with said signal − xo;
   second sampling and counting means for sampling and counting the output signals of said second comparing means;
   means for periodically resetting the first and second counting means to zero after a predetermined repetition period, and;
   means for producing a clutter presence signal when the contents of the two counting means both exceed a predetermined value during the said repetition period.

2. An arrangement according to claim 1, wherein the means for producing a clutter presence signal comprise an AND circuit which has two inputs connected respectively to the outputs of the first and second sampling and counting means, and an RS flip-flop circuit having an input connected to the output of the AND circuit and a zero-reset input connected to the output of the periodically resetting means.

3. An arrangement according to claim 1, wherein the first comparing means has a non inverting input which receives the said angular divergence signals and an inverting input which receives the threshold signal + xo and wherein the second comparing means has a non inverting input which receives the threshold signal − xo and an inverting input which receives the angular divergence signals.

4. An arrangement according to claim 1, further including a clock and a first counter for receiving pulses from said clock and wherein said first and second sampling and counting means each include a bistable flip-flop circuit of the RS type connected respectively to the first and second comparing means, the said flip-flop circuits having a zero reset input which receives the pulses from the clock, and a further counter which is connected respectively to the outputs of the flip-flop circuit, and further including means for resetting the said first, and further counters to zero when the first counter has reached its maximum capacity.

5. An arrangement according to claim 4, further comprising means for resetting each RS flip-flop to zero when one of the respective further counters has reached its maximum capacity.

6. In a radar system having an antenna, an arrangement for discriminating clutter reception signals from target reception signals, said arrangement comprising:
   means for supplying signals indicating the angular divergence between the direction from which are received said reception signals and at least one plane of symmetry of the antenna;
   first comparing means connected to said receiving means for comparing the said angular divergence signals with a first positive threshold + xo;
   first measuring means for measuring the probability P1 with which the threshold + xo is positively exceeded by said divergence signal, and
   second comparing means connected to said receiving means for comparing the said angular divergence signals with a second negative threshold + xo,
   second measuring means for measuring the probability P2 with which the threshold − xo is negatively exceeded by said divergence signal, and
   comparing means for comparing said probabilities P1 and P2 with a predetermined value Po, and
   means for producing a clutter presence signal when said probabilities P1 and P2 are simultaneously greater than Po.

* * * * *